US011997022B2

(12) United States Patent
G et al.

(10) Patent No.: US 11,997,022 B2
(45) Date of Patent: May 28, 2024

(54) SERVICE-TO-SERVICE SCHEDULING IN CONTAINER ORCHESTRATORS

(71) Applicant: International Business Machines Corporation, Armonk, NY (US)

(72) Inventors: Kavya G, Chennai (IN); Chander Govindarajan, Chennai (IN); Mudit Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 17/353,219

(22) Filed: Jun. 21, 2021

(65) Prior Publication Data
US 2022/0407816 A1    Dec. 22, 2022

(51) Int. Cl.
*H04L 47/78*    (2022.01)
*G06N 20/00*    (2019.01)
(Continued)

(52) U.S. Cl.
CPC .......... *H04L 47/781* (2013.01); *G06N 20/00* (2019.01); *H04L 47/29* (2013.01); *H04L 47/722* (2013.01); *H04L 47/805* (2013.01)

(58) Field of Classification Search
CPC ........ G06F 9/50; G06F 9/5011; G06F 9/5027; G06F 9/5033; G06F 9/5044; G06F 2209/503; G06F 2209/508; G06N 20/00; H04L 47/722; H04L 47/29; H04L 47/805; H04L 47/781
See application file for complete search history.

(56) References Cited

U.S. PATENT DOCUMENTS 10,284,636 B2 *   5/2019   Stelmar Netto .... H04L 41/0896
10,848,594 B1    11/2020   Zemlerub et al.
(Continued)

FOREIGN PATENT DOCUMENTS

CN    108512890    9/2018
EP      3637685    4/2020
(Continued)

OTHER PUBLICATIONS

Govindarajan et al., Network Aware Container Orchestration for Telco Workloads, IEEE, 10 pages, 2022.*
(Continued)

*Primary Examiner* — Frank Duong
(74) *Attorney, Agent, or Firm* — Ryan, Mason & Lewis, LLP

(57) ABSTRACT

Methods, systems, and computer program products for service-to-service scheduling in container orchestrators are provided herein. A computer-implemented method includes reserving, by a network orchestrator, network resources requested between a plurality of services, wherein each of the services is implemented as one or more replicas running on a set of nodes of a cluster, managed by the network orchestrator, that use the network resources to serve incoming requests to the plurality services; monitoring utilization of the network resources; and scheduling, by the network orchestrator based on the monitoring, one or more new replicas of the plurality of services and the incoming requests to the plurality of services in a collaborative manner to increase at least one network performance characteristic.

20 Claims, 9 Drawing Sheets

(51) Int. Cl.
*H04L 47/10* (2022.01)
*H04L 47/722* (2022.01)
*H04L 47/80* (2022.01)

(56) References Cited

U.S. PATENT DOCUMENTS

| | | | | |
|---|---|---|---|---|
| 10,924,535 | B2* | 2/2021 | Du | H04L 67/1008 |
| 2011/0022697 | A1 | 1/2011 | Huh | |
| 2012/0269053 | A1 | 10/2012 | Yu et al. | |
| 2017/0063648 | A1* | 3/2017 | Nadaf | G06F 9/5011 |
| 2019/0052532 | A1* | 2/2019 | Chen | H04L 41/0895 |
| 2019/0081907 | A1* | 3/2019 | Gopalakrishnan | H04L 41/0823 |
| 2019/0306755 | A1 | 10/2019 | Chaudhuri et al. | |
| 2020/0264926 | A1* | 8/2020 | Dasgupta | G06F 9/5044 |
| 2020/0267212 | A1* | 8/2020 | Chatt | H04L 47/828 |
| 2022/0164186 | A1* | 5/2022 | Pamidala | G06F 9/5088 |
| 2022/0357995 | A1* | 11/2022 | Moussaoui | G06F 9/5033 |

FOREIGN PATENT DOCUMENTS

| WO | WO 2019/117593 | * | 6/2019 |
|---|---|---|---|
| WO | 2020121293 | | 6/2020 |

OTHER PUBLICATIONS

Srirama et al., Application deployment using containers with autoscaling for microservices in cloud environment, Elsevier, 20 pages, Apr. 2, 2020.*
Xu et al., Dynamic Resource Allocation for Load Balancing in Fog Environment, Hindawi, 16 pages, Apr. 26, 2018.*
English Translation of WO 2019/117593, 11 pages, Jun. 2019.*
Mell, Peter, et al., The NIST Definition of Cloud Computing, National Institute of Standards and Technology, U.S. Department of Commerce, NIST Special Publication 800-145, Sep. 2011.
Tung, Yu-Chih, Kate Ching-Ju Lin, and Cheng-Fu Chou. "Bandwidth-aware replica placement for peer-to-peer storage systems." 2011 IEEE Global Telecommunications Conference—GLOBECOM 2011. IEEE, Dec. 9, 2011.
Leontyev, Hennadiy, and James H. Anderson. "A Hierarchical Multiprocessor Bandwidth Reservation Scheme with Timing Guarantees." 2008 Euromicro Conference on Real-Time Systems. IEEE, 2008.
Eidenbenz, Raphael, Yvonne-Anne Pignolet, and Alain Ryser. "Latency-Aware Industrial Fog Application Orchestration with Kubernetes." 2020 Fifth International Conference on Fog and Mobile Edge Computing (FMEC). IEEE, 2020.
Zandu, Vikas. "A Model of Resource-Aware Load Balancing Scheme using Multi-objective Optimization in Cloud environment," Jun. 2016.
Yousafzai, Abdullah, Abdullah Gani, and Rafidah Md Noor. "Availability aware continuous replica placement problem." arXiv preprint arXiv:1605.04069, May 13, 2016.
Xie, Di, et al. "The only constant is change: Incorporating time-varying network reservations in data centers." Proceedings of the ACM SIGCOMM 2012 conference on Applications, technologies, architectures, and protocols for computer communication. 2012.
Guo, Chuanxiong, et al. "Secondnet: a data center network virtualization architecture with bandwidth guarantees." Proceedings of the 6th International COnference. 2010.
Gember, Aaron, et al. Stratos: A network-aware orchestration layer for middleboxes in the cloud. Technical Report, 2013.
Ballani, Hitesh, et al. "Towards predictable datacenter networks." Proceedings of the ACM SIGCOMM 2011 Conference. 2011.
Xu, Cong, Karthick Rajamani, and Wesley Felter. "Nbwguard: Realizing network qos for kubernetes." Proceedings of the 19th International Middleware Conference Industry. 2018.
Santos, Jose, et al. "Towards network-aware resource provisioning in Kubernetes for fog computing applications." 2019 IEEE Conference on Network Softwarization (NetSoft). IEEE, 2019.
International Search Report and Written Opinion from International Application No. PCT/CN2022/092063, 9 pages, dated Aug. 10, 2022.

* cited by examiner

US 11,997,022 B2

SERVICE-TO-SERVICE SCHEDULING IN CONTAINER ORCHESTRATORS

BACKGROUND

The present application generally relates to information technology and, more particularly, to container orchestration.

Containers generally refer to an executable unit of software in which application code is packaged, along with its libraries and dependencies, so that it can run on multiple types of operating systems. Accordingly, containers can be run in different scenarios, such as, for example, on-premise, in a public cloud, and/or in a private cloud. A container orchestrator can be used to manage multiple containers across a distributed system.

SUMMARY

In one embodiment of the present disclosure, techniques for service-to-service scheduling in container orchestrators are provided. An exemplary computer-implemented method includes reserving, by a network orchestrator, network resources requested between a plurality of services, wherein each of the services is implemented as one or more replicas running on a set of nodes of a cluster, managed by the network orchestrator, that use the network resources to serve incoming requests to the plurality services; monitoring utilization of the network resources; and scheduling, by the network orchestrator based on the monitoring, one or more new replicas of the plurality of services and the incoming requests to the plurality of services in a collaborative manner to increase at least one network performance characteristic, wherein said scheduling comprises at least one of: scheduling one or more of the new replicas of a given one of the plurality of services on one or more nodes in the set, and scheduling one or more of the incoming requests for a given one of the plurality of services to one or more of the replicas corresponding to the given service.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Applications with strict network quality of service (QoS) constraints (e.g., telephone company workloads, real time systems, etc.) should have guaranteed, predictable networking parameters, such as, for example, bandwidth and latency constraints. Such workloads are increasingly being moved from virtual machines (VMs), which usually provide per host (e.g., VM) bandwidth restrictions to containers.

This presents some challenges as, for example, container orchestrators do not support guaranteed bandwidths between services. Also, existing approaches manage load balancing and orchestration as separate layers in VMs, thus these approaches are not applicable to container orchestration. The number of containers can also be several orders of magnitude larger than a VM implementation, and the average container life cycle is much shorter than a VM. Further, containers have much smaller startup times (e.g., <1 second, compared to several minutes for VMs) and smaller lifetimes, which prevent static allocations from being an option.

In container-based deployments, the container orchestrator typically is responsible for replica scheduling and request scheduling. Generally, replicas refer to different instances of a service, and replica scheduling refers to deploying the replicas on worker nodes. It is noted that replica-to-worker mapping may be performed in different ways, but generally, multiple replicas of a single service are not mapped to a single worker node to increase redundancy.

Request scheduling refers to forwarding incoming requests to one of k replicas and balancing traffic load between the replicas.

Existing techniques for replica scheduling and request scheduling do not account for network reservation requirements. Additionally, replicas are integral to container-based deployment, which limits the ability to extend VM network reservation techniques.

As described herein, an exemplary embodiment includes techniques for network reservation between containers running on a cluster with an underlying network (e.g., physical or virtual) and services backed by multiple replicas. In some example embodiments, a container orchestrator schedules one or more of: new replicas for an existing service and incoming requests to services, while respecting existing network resource reservation. The container orchestrator, in some embodiments, enables collaborative scheduling of such replicas and requests. In at least one example embodiment, the container orchestrator enables auto-scaling of network resources based on resource utilization. Additionally, one or more example embodiments implements a service annotation mechanism using tags to support network reservation for workflows involving multiple service chains.

Figure 1:
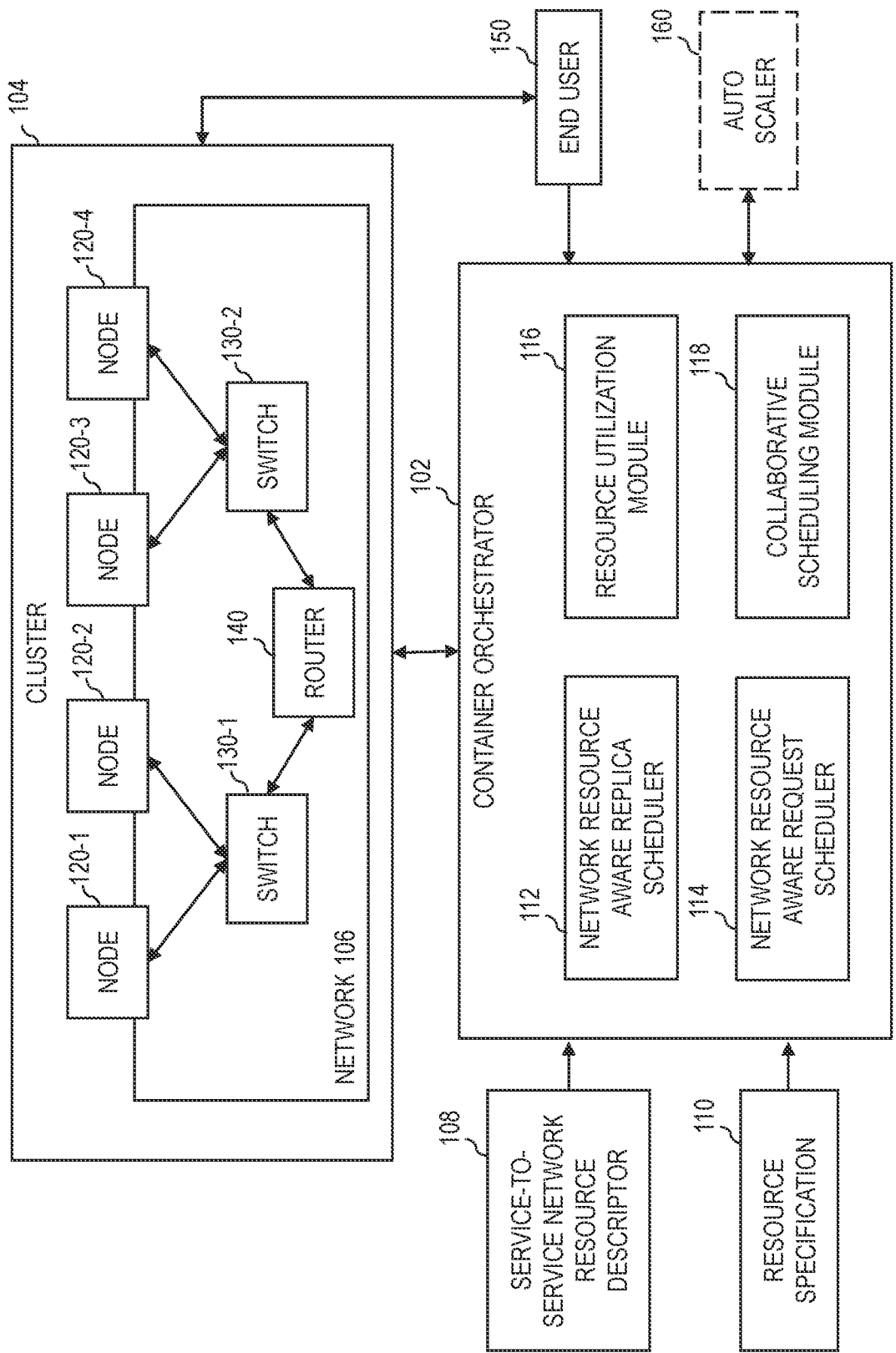
FIG. 1 is a diagram illustrating a system architecture in accordance with exemplary embodiments.

FIG. 1 is a diagram illustrating a system architecture in accordance with exemplary embodiments. By way of illustration, FIG. 1 depicts a container orchestrator 102 and a cluster 104. The cluster 104 includes a set of nodes, which in this example include nodes 120-1, 120-2, 120-3, and 120-4 (collectively referred to herein as nodes 120). The nodes 120 are connected to a network 106. The network 106 comprises various network components, which in the FIG. 1 embodiment include two switches 130-1, 130-2 and a router 140. It is to be appreciated that the architecture shown in FIG. 1 is merely an example and other arrangements are also possible, such as, for example, having different numbers of clusters, nodes, and network components.

The container orchestrator 102 includes a network resource ("NR") aware replica scheduler 112, an NR aware request scheduler 114, a collaborative scheduling module 118, and a resource utilization module 116. Generally, the container orchestrator 102 obtains input in the form of and a SSNRD 108 (service-to-service network resource descriptor) and a resource specification 110, which is used by the NR aware replica scheduler 112 to schedule containers (or replicas) onto the nodes 120 with requisite bandwidths.

The resource utilization module 116 obtains information related to the link utilization of ingress and egress traffic between services on the nodes 120. By way of example, each of the nodes 120 may include a network resource monitor (not shown in FIG. 1), which provides the information to the resource utilization module 116.

When an end user 150 (or another service) attempts to connect to a target service having an associated SSNRD on the cluster 104, the NR aware request scheduler 114 selects the appropriate target replica of the service to forward the request to, based on the current network link utilization.

The collaborative scheduling module 118 enables, in at least some embodiments, improved utilization of the underlying network resources, reduced disruptions to existing connections and/or flows, and dynamic changes to the network policy, as explained in more detail elsewhere herein. The FIG. 1 embodiment optionally (as indicated by dashes) includes an auto scaler 160, which provides an interface for scaling network resources of the network 104, as described in more detail elsewhere herein.

Generally, the SSNRD 108 specifies network resources between two given services. The SSNRD 108 may include a plurality of fields, which may include, for example: a source service; a destination service; an expected replica count of each service (e.g., used to proportionally scale network resources); a bandwidth range (e.g., minimum-maximum bandwidth); maximum tolerable latency; and quality of service (QoS) level (e.g., best effort, guaranteed, etc.).

At least one example embodiment includes a process for network reservation between containers running on a cluster (e.g., cluster 104). Such a process may include reserving network resources at each endpoint, as well as any intermediate switches and router. Such a process can be implemented using one or more traffic control tools (such as, for example, OpenFlow, Linux tc, and/or eBPF/XDP. Additionally, a network resources monitor may continuously measure resource utilization at each endpoint. For example, the network resources monitor may be used to enable request scheduling and collaborative request scheduling (such as to de-emphasize certain replicas, for example). The network resources monitor may also be used to trigger auto-scaling.

Figure 2:
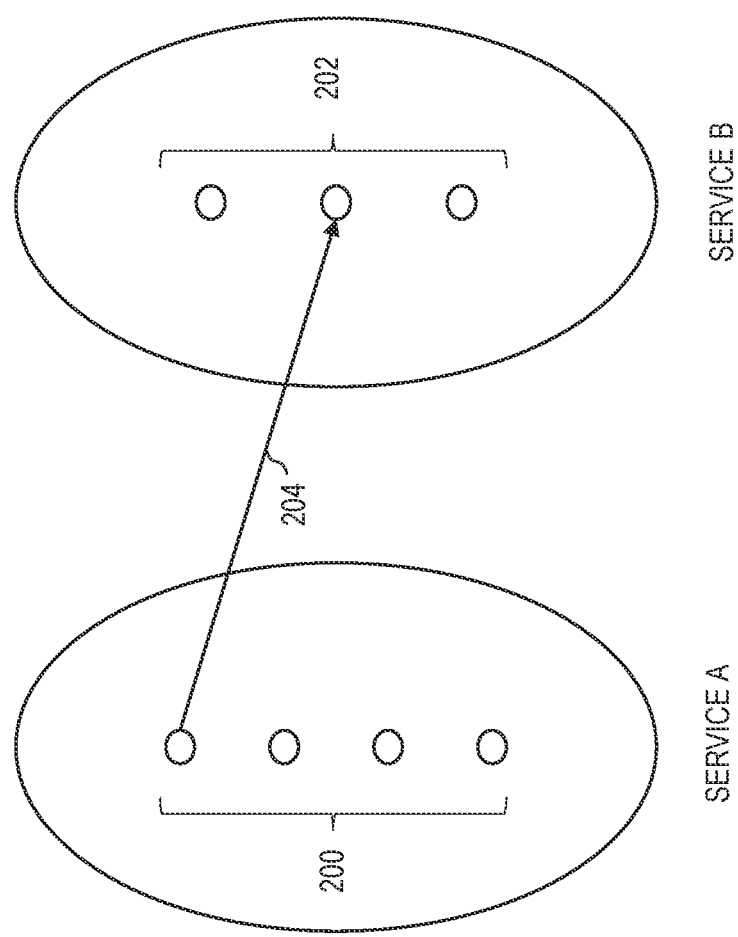
FIG. 2 is a diagram illustrating an example of service-to-service network reservation in accordance with exemplary embodiments.

FIG. 2 is a diagram illustrating an example of service-to-service network reservation in accordance with exemplary embodiments. In the FIG. 2 example, service A and service B include a respective set of replicas 200, 202. Also shown in FIG. 2, is a link 204 from a replica of service A in set 200 to a replica of service B in set 202. According to one example embodiment, the initial distribution of network resources may be balanced equally among all replicas. In this manner, every replica of service A may have outgoing traffic, denoted M/a, and every replica of service B may have incoming traffic, denoted M/b. Accordingly, the link 204 may be denoted M/(ab). In some embodiments, the network resources may be rescheduled if a request cannot be met on the scheduled hardware. Additionally, in order to minimize changes to existing reservations, unequal loads may be scheduled to new replicas. In some embodiments, a user may at least one of: specify new resource requests when scaling up or down, specify that the total resource requests remain the same when scaling up or down, and specify that the total resource requests scale proportionally when scaling up or down.

Figure 3:
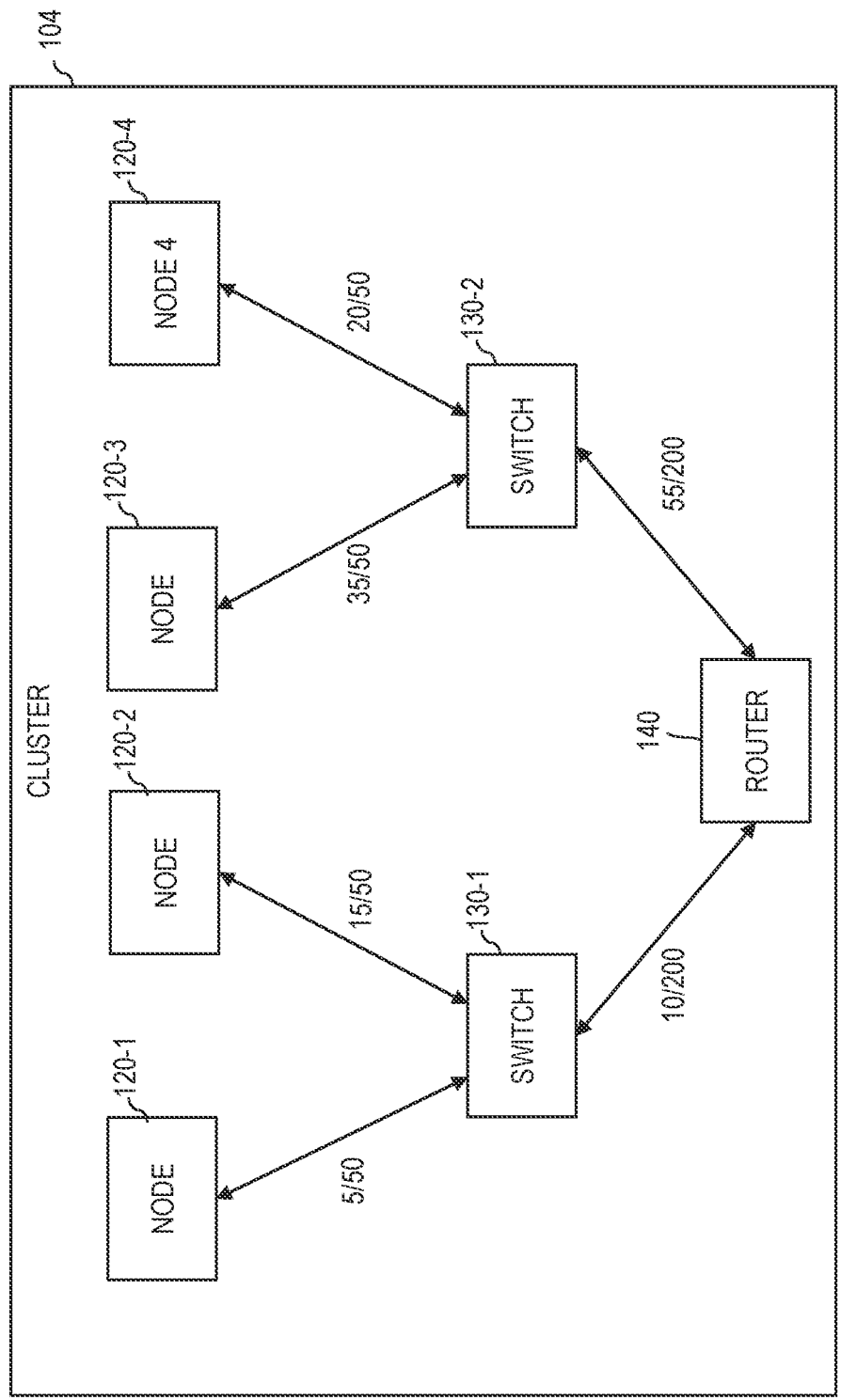
FIG. 3 is a diagram illustrating an example of network resource aware replica scheduling in accordance with exemplary embodiments.

FIG. 3 is a diagram illustrating an example of NR aware replica scheduling in accordance with exemplary embodiments. The scheduling may be performed at least in part by the NR aware replica scheduler 112 of the container orchestrator 102, for example. In this example, the scheduling each link is allocated a certain amount of bandwidth. More specifically, in FIG. 3, the link between router 140 and switch 130-1 is using 10 out of 200 units of allocated bandwidth (denoted as $10/200$). The links between switch 130-1 and nodes 120-1 and 120-2 are using 5 out of 50 units of bandwidth and 15 out of 50 units of bandwidth, respectively. Additionally, the link between router 140 and switch 130-2 is using 55 out of 200 units of allocated bandwidth, and the links between switch 130-2 and nodes 120-3 and 120-4 are using 35 out of 50 units of bandwidth and 20 out of 50 units of bandwidth, respectively.

The initial placement of the replicas may be determined using constraint satisfaction methods. For example, in some embodiments the replica scheduling may be performed using integer linear programming techniques, machine learning techniques, or other such techniques. Additionally, one or more embodiments may include specifying a maximum acceptable latency. For example, a request description (e.g., SSNRD 108) may include a maximum tolerable latency between two services (or replicas), and a hint may be passed to the NR aware replica scheduler. In some example embodiments, if a schedule cannot be determined that satisfies the constraints, an error is returned to the user which indicates that an acceptable schedule cannot be found. The user may, for example, choose to upgrade overall cluster capacity or loosen their constraints in response to such an error.

Figure 4:
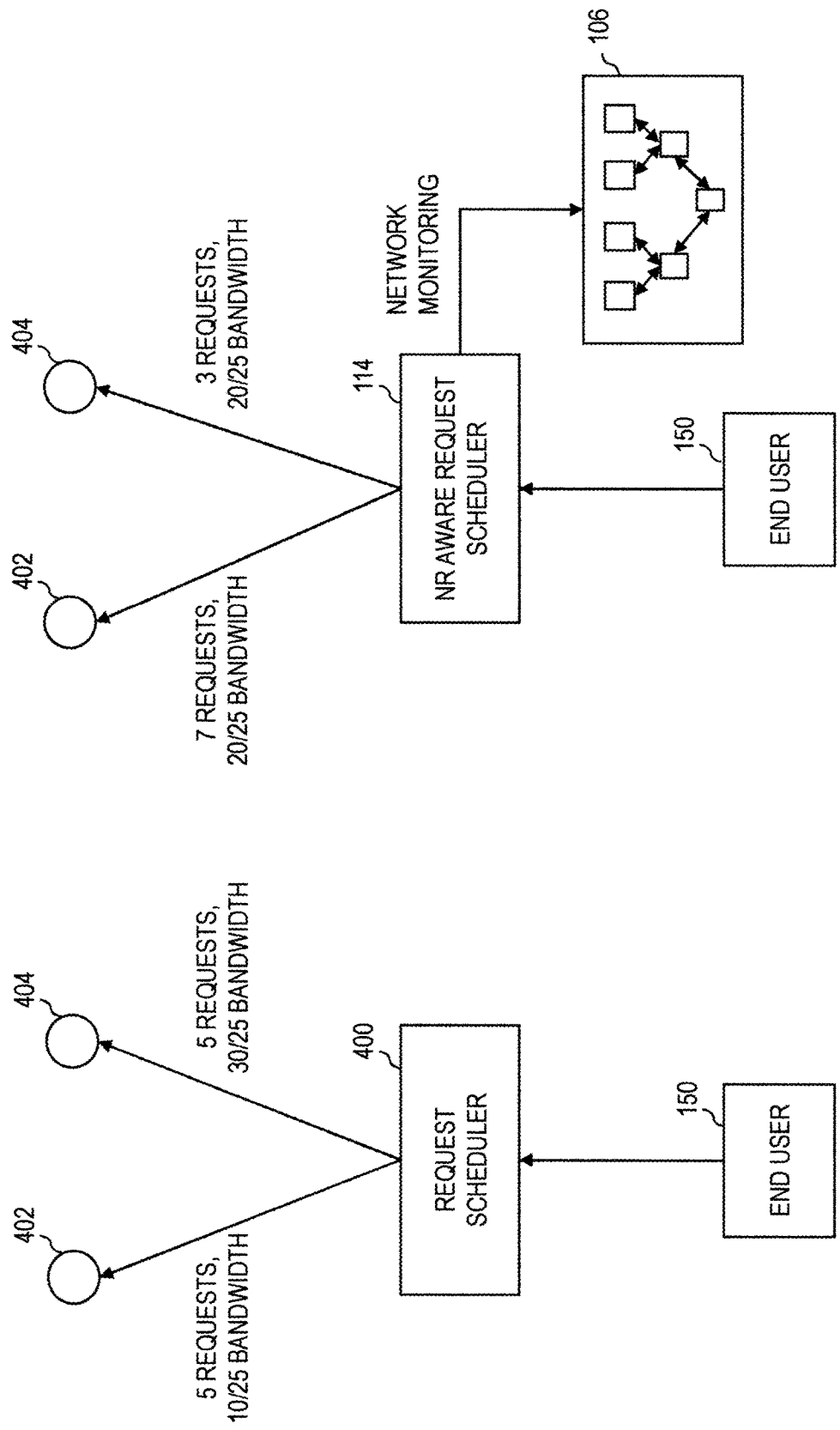
FIGS. 4A-4B show diagrams illustrating techniques for request scheduling in accordance with exemplary embodiments.

FIGS. 4A-4B show diagrams illustrating techniques for request scheduling in accordance with exemplary embodiments. FIG. 4A shows a conventional request scheduler 400 that applies a round robin technique for request scheduling. Accordingly, the request scheduler 400 simply alternates between the two replicas 402, 404 to serve ten requests. In this example, replica 402 is scheduled with $10/25$ bandwidth units for 5 requests, whereas replica 404 is scheduled with $30/25$ bandwidth units for the other 5 requests. It can be seen from FIG. 4A that an equal distribution of the number of requests does not result in an equal distribution of network traffic.

FIG. 4B shows an example of request scheduling by the NR aware request scheduler 114. In this example, it is assumed that the NR aware request scheduler 114 handles the same number of requests and is under the same network constraints as the example shown in FIG. 4A. In this example, NR aware request scheduler 114 routes requests to satisfy network constraints based on monitoring of the network 106. This allows the NR aware request scheduler 114 to handle all 10 requests by scheduling 7 of the requests that require 20 units bandwidth on replica 402 and 3 requests that require 20 units of bandwidth on replica 404.

Figure 5:
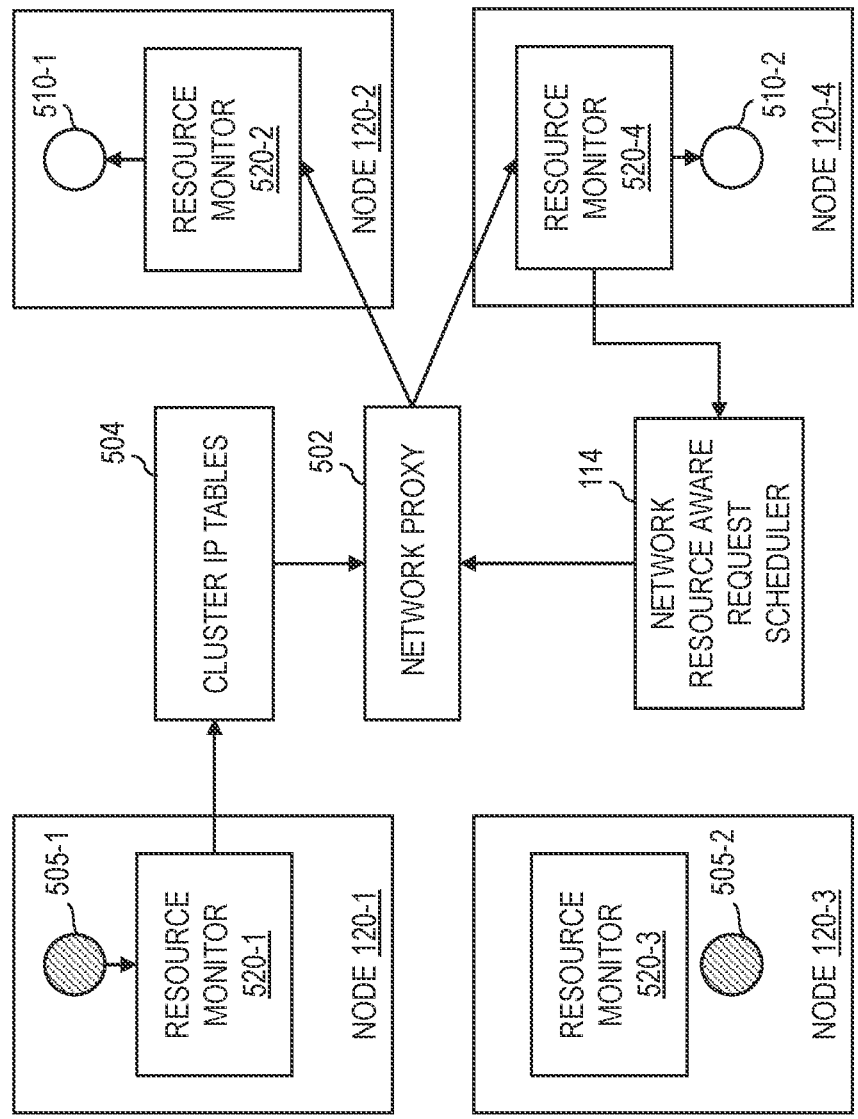
FIG. 5 is a diagram illustrating an example of network resource aware request scheduling in accordance with exemplary embodiments.

FIG. 5 is a diagram illustrating an example of network resource aware request scheduling in accordance with an exemplary embodiment. In this example, the NR aware request scheduler 114 may perform such scheduling using rule changes associated with a network proxy 502 (e.g., a Kube-proxy) with respect to one or more cluster IP tables 504. More specifically, in the example shown in FIG. 5, replicas 505-1, 505-2 of a first service (as indicated by the shaded circles) are deployed on nodes 120-1 and 120-3, respectively, and replicas 510-1, 510-2 of a second service are deployed on nodes 120-2 and 120-4, respectively. Each node also includes respective resource monitors 520-1 . . . 520-4 that monitor ingress and egress traffic between the services. In this example, replica 505-1 attempts to connect to a service virtual IP address of the second service. The network proxy 502 resolves the cluster IP tables 504 to a node (or pod) IP based on, for example, a round robin technique, and the request is served by replica 510-2 of the second service. The resource monitor 520-4 track the network usages on node 120-4 and informs the NR aware request scheduler 114 that a network limit has been reached. The NR aware request scheduler 114 programs new routing rules on the load balancer, which in the FIG. 5 example is the network proxy 502. As a result, requests of replicas 505-1, 505-2 of the first service towards the second service are now served by replica 510-1 of the second service until, for example, traffic to replica 510-2 is reduced. In some example embodiments, hard limits can be assigned to enable automatic packet drops at network links, such as when all replicas are throttled, for example.

In at least some embodiments, an interface may be provided for network resource scaling, such as between container orchestrator 102 and auto scaler 160, for example. The network resource scaling may include scheduling new replicas, changing existing replica quotas, and re-scheduling the replicas. Re-scheduling the new replicas may include deploying the new replicas and destroying the old replicas once the new replicas are ready.

One or more example embodiments provide techniques for the container orchestrator to collaboratively schedule requests and replicas. Such techniques enable the underlying network resources to be used more efficiently, reduce disruptions to existing connections and/or service workflows, as well as allow dynamic changes to the network policy. As an example, assume service A has four replicas, service B has five replicas, and the traffic between the services is 100 Mbps. Accordingly, the traffic can be spread out between the replicas such that each replica of service A has 25 Mbs, and each replica of service B has 20 Mbps. Now assume B is scaled up to six replicas and traffic increases to 120 Mbps. A simple approach is to increase the outgoing traffic of each replica of service A to 30 Mbps. However, in some situations one or more nodes and/or components of the network may not support such increase. A collaborative approach may increase traffic of individual ones of the replicas of service A (e.g., increasing two of the replicas of service A to 35 Mbps) based on what is supported.

According to one example embodiment, if a service needs to scale up network resources, then the traffic can be increased to all of the replicas of the service. If the nodes do not support the increased traffic, then at least one replica may be created and the extra traffic can be re-routed to the new replica by the request scheduler. As another example, if a single traffic flow needs to be split across multiple replicas, then the quota can be increased for a single replica to handle the flow, and the replica can be rescheduled to another node which supports the full flow. In situations when the initial placement of the replica is impracticable, then the traffic can be distributed unequally depending on the available node quotas.

An example process for scaling up the number of replicas for a given service from X to Y with an initial bandwidth b, may include determining one of the following bandwidth scenarios: (1) bandwidth remains fixed; (2) bandwidth scales proportionately; or (3) a new bandwidth, b', is specified (e.g., by a user) that is greater than the bandwidth b. For bandwidth scenario (1), the process includes reducing the limits of each existing replica by X/Y, and allocating Y-X new replicas each having bandwidth equal to b/Y. For bandwidth scenario (2), the process includes allocating Y-X new replicas with bandwidth b/X. For bandwidth scenario (3), the process includes: allocating Y-X new replicas with a bandwidth limit c and determining whether the bandwidth limit of the existing replicas can be increased to c to handle bandwidth b'. The bandwidth limit c is equal to b'/Y. If yes, then the limits of the existing replicas are changed to c. If no, then the process determines whether excess traffic on the existing replicas can be redirected to the new replicas. If yes, the replicas are re-scheduled, and if no, the requests are rescheduled. Those skilled in the art will appreciate that the scaling process described above can be extended to other situations, such as, scaling down the replicas of the service, and scaling up or down another service in the service-to-service pair, for example.

Generally, network resources can only be reserved between two services as a whole with SSNRD. One or more embodiments further enhance the SSNRD to enable network resources to be reserved at a service chain level. As an example, consider a workflow with the following service chains: A→C→D and B→C→D. In this example, the chains include a shared service-pair, namely, C→D. In such situations, the replicas of services can be tagged with annotations so that the replica and request scheduling techniques described herein may be applied using such tags. In the example above, SSNRDs for the service chains above may include the following information:

SSNRD1:
        Source: C
        Destination: D
        Replica count: 2,2
        BW: (2 Mbps, 10 Mbps)
        Latency: 10 us
        Tag: T1
    SSNRD2:
        Source: C
        Destination: D
        Replica count: 3,3
        BW: (20 Mbps, 50 Mbps)
        Latency: 20 us
        Tag: T2

A workflow level resource request descriptor may then be used by a user to specify entire service workflow's network resources, such as, for example, as follows:

servicechain1:
      tag: T1
      services: [A,C,D]
      servicePairs:
         SSNRD(A, C, . . . )
         SSNRD(C, D, . . . )
   servicechain2:
      tag: T2
      services: [B,C,D]
      servicePairs:
         SSNRD(B, C, . . . )
         SSNRD(C, D, . . . )

Additionally, embodiments described herein may be applied to multiple container clusters, wherein each container cluster is managed by an orchestrator, such as when a virtual network connects the clusters. In such embodiments, collaboration between container orchestrators can be enabled to achieve network reservation between services across container clusters.

Figure 6:
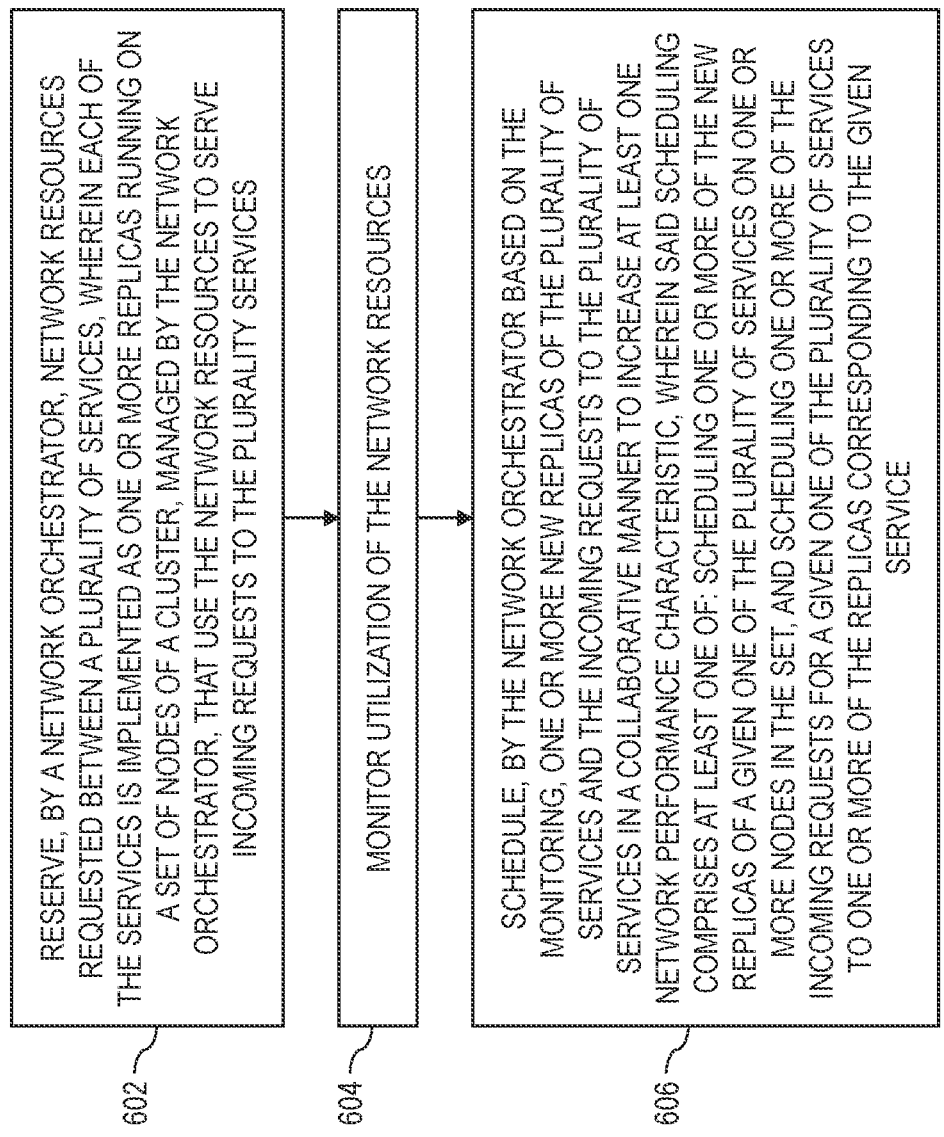
FIG. 6 is a flow diagram illustrating techniques in accordance with exemplary embodiments.

FIG. 6 is a flow diagram illustrating techniques in accordance with exemplary embodiments. Step 602 includes reserving, by a network orchestrator, network resources requested between a plurality of services, wherein each of the services is implemented as one or more replicas running on a set of nodes of a cluster, managed by the network orchestrator, that use the network resources to serve incoming requests to the plurality services. Step 604 includes monitoring utilization of the network resources. Step 606 includes scheduling, by the network orchestrator based on the monitoring, one or more new replicas of the plurality of services and the incoming requests to the plurality of services in a collaborative manner to increase at least one network performance characteristic, wherein said scheduling comprises at least one of: scheduling one or more of the new replicas of a given one of the plurality of services on one or more nodes in the set, and scheduling one or more of the incoming requests for a given one of the plurality of services to one or more of the replicas corresponding to the given service.

The steps may include a step of obtaining at least one specification indicating the network resources requested between the plurality of services, wherein the specification identifies: a first one of the plurality of services as a source service; a second one of the plurality of services as a destination service; a replica count for each of the source service and the destination service; and one or more network requirements for the source and the destination service; wherein the reserving is based at least in part on the at least one specification. The at least one specification may further identify a tag corresponding to a chain of services comprising: the source service, the destination service, and at least another one of the plurality of services, and wherein the reserving comprises using the tag to reserve the network resources for the chain of services. The one or more network requirements may include at least one of: a threshold latency value specified for the source service and the destination service; a quality-of-service level; and a bandwidth range. Scheduling the one or more of the new replicas of a given one of the plurality of services on one or more nodes in the set may include: performing at least one of an integer linear programming technique and a machine learning technique based at least in part on the one or more network requirements and one or more network constraints. Scheduling the one or more incoming requests for a given one of the plurality of services to one or more corresponding replicas of the given service may include: distributing the one or more incoming requests across the set of nodes by at least one of: adjusting at least one internet protocol table associated with at least one of the nodes in the set based on the monitoring, and automatically dropping one or more of the incoming requests based on one or more network constraints. The at least one network performance characteristics may include one or more of: decreasing downtime of a network associated with the cluster; and increasing a number of pairs of the plurality of services supported by the network resources. The scheduling of step 606 may include: automatically scaling one or more of a number of replicas running on the set of nodes for one or more of the plurality of services, and an amount of network resources reserved for one or more nodes in the set. The monitoring of step 604 may include: obtaining link utilization information of a network associated with the cluster, the network comprising: the set of nodes, at least one switch, and at least one router. The reserving of step 602 may include: communicating, by the network orchestrator, with at least one further network orchestrator associated with at least one further cluster to collaboratively reserve network resources requested between one of the plurality services and at least one further service implemented on the at least one further cluster.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 7:
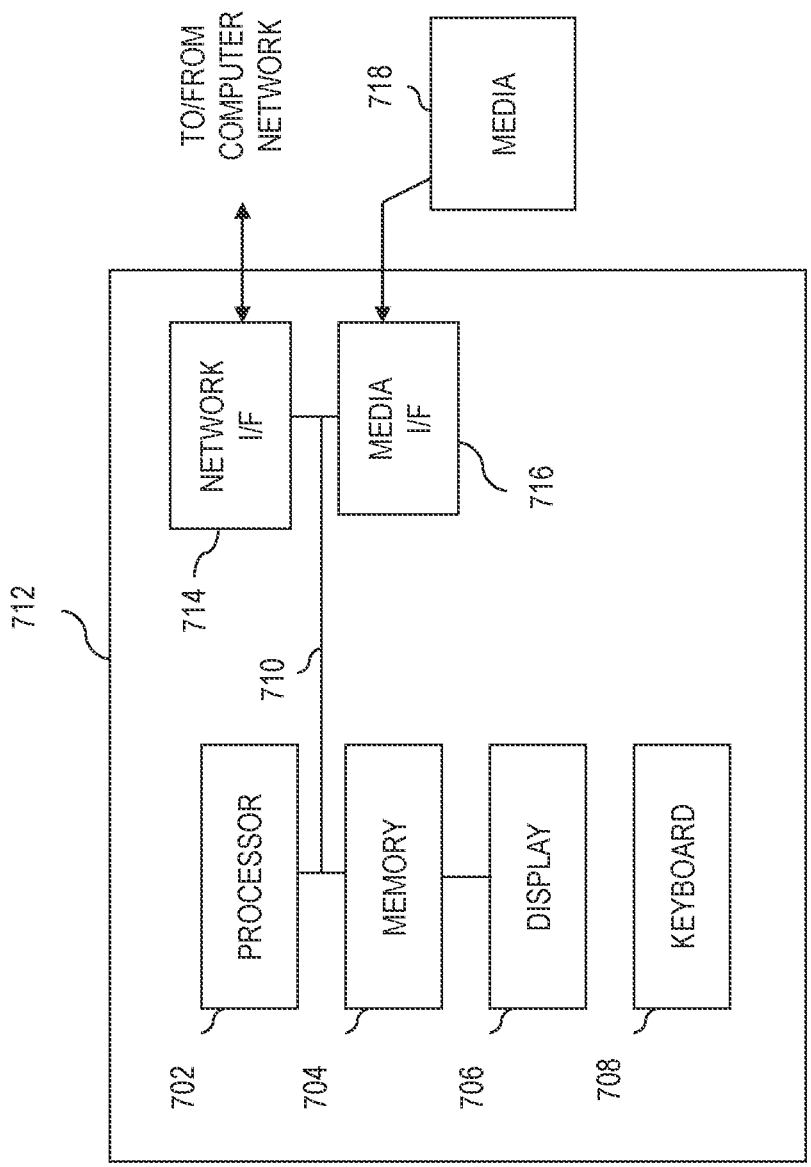
FIG. 7 is a system diagram of an exemplary computer system on which at least one embodiment of the present disclosure can be implemented.

Additionally, an embodiment of the present disclosure can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
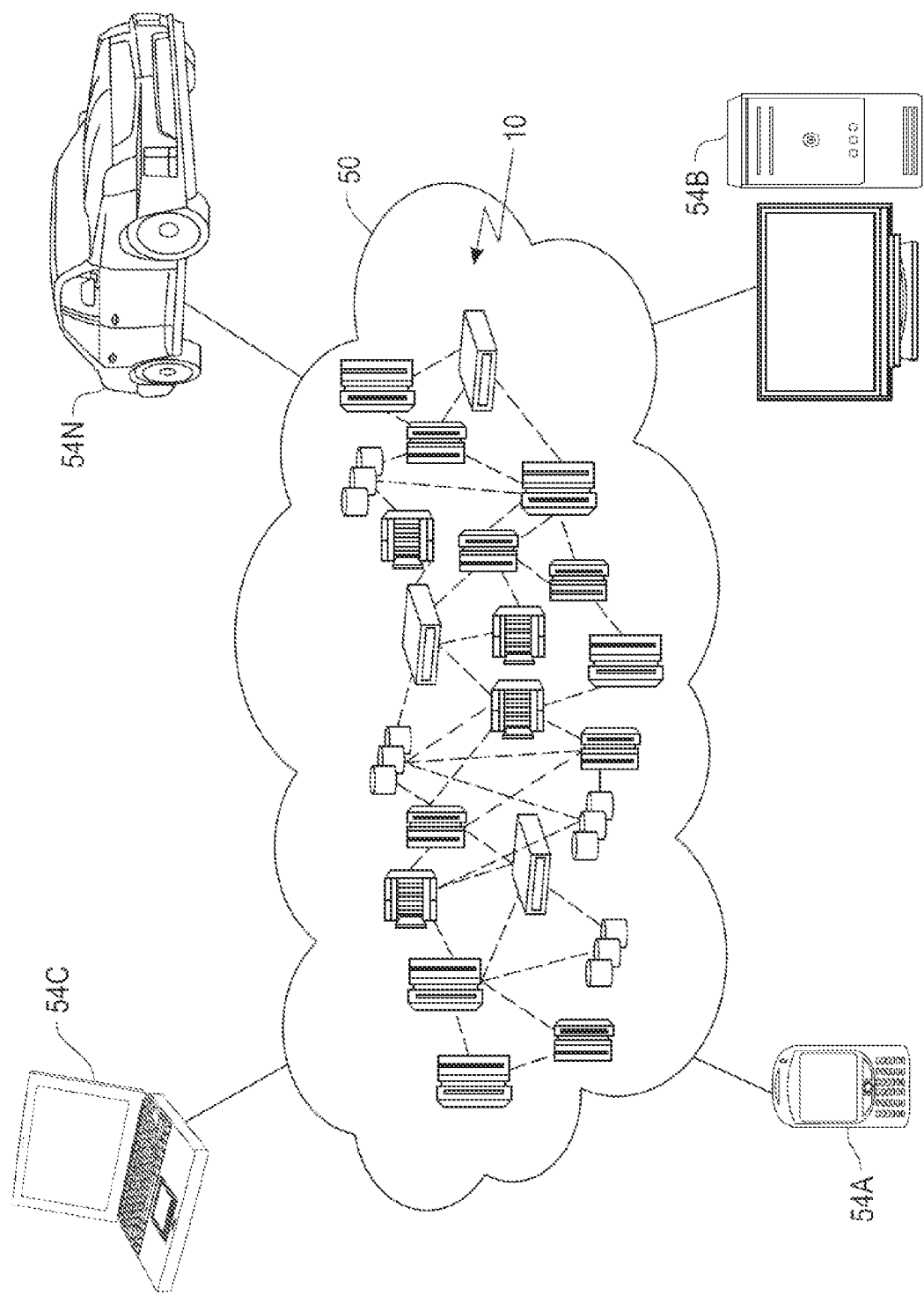
FIG. 8 depicts a cloud computing environment in accordance with exemplary embodiments.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
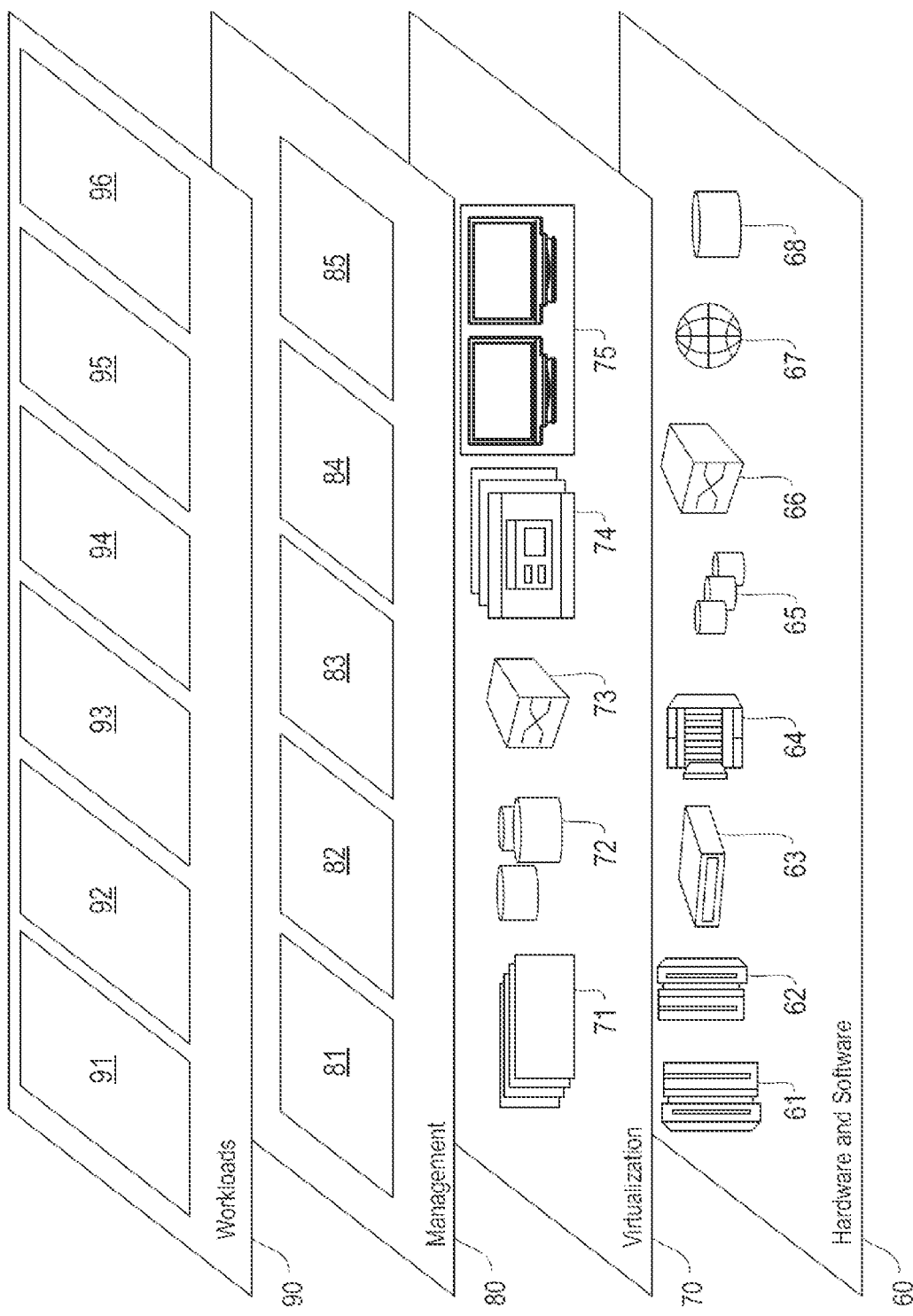
FIG. 9 depicts abstraction model layers in accordance with exemplary embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service-to-service scheduling 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide one or more beneficial effects such as, for example, enabling efficient resource-aware scheduling of requests and/or replicas in container-based deployments to improve the utilization of network resources and to reduce disruptions with connections in the network; provide predictable network performance for applications; avoid inadvertent interference between applications running as containers on the same clusters; and enable planning of cluster deployment (such as, e.g., link capacities, NIC requirements etc.).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining at least one specification indicating network resources requested between a plurality of services, wherein each of the services is implemented as one or more replicas running on a set of nodes of a cluster, managed by a network orchestrator, that use the network resources to serve incoming requests to the plurality services;
    reserving, by the network orchestrator based at least in part on the at least one specification, the network resources requested between the plurality of services;
    monitoring utilization of the network resources; and
    scheduling, by the network orchestrator based on the monitoring, one or more new replicas of the plurality of services and the incoming requests to the plurality of services in a collaborative manner to increase at least one network performance characteristic, wherein said scheduling comprises at least one of: scheduling one or more of the new replicas of a given one of the plurality of services on one or more nodes in the set, and scheduling one or more of the incoming requests for a given one of the plurality of services to one or more of the replicas corresponding to the given service;
    wherein the method is carried out by at least one computing device.

2. The computer-implemented method of claim 1, wherein the at least one specification identifies:
    a first one of the plurality of services as a source service;
    a second one of the plurality of services as a destination service;
    a replica count for each of the source service and the destination service; and
    one or more network requirements for the source and the destination service.

3. The computer-implemented method of claim 2, wherein the at least one specification further identifies a tag corresponding to a chain of services comprising: the source service, the destination service, and at least another one of the plurality of services, and wherein the reserving comprises using the tag to reserve the network resources for the chain of services.

4. The computer-implemented method of claim 2, wherein the one or more network requirements comprise at least one of:
    a threshold latency value specified for the source service and the destination service;
    a quality-of-service level; and
    a bandwidth range.

5. The computer-implemented method of claim 4, wherein the scheduling one or more of the new replicas of a given one of the plurality of services on one or more nodes in the set comprises:
    performing at least one of an integer linear programming technique and a machine learning technique based at least in part on the one or more network requirements and one or more network constraints.

6. The computer-implemented method of claim 1, wherein scheduling one or more of the incoming requests for a given one of the plurality of services to one or more of the replicas corresponding to the given service comprises:
    distributing the one or more incoming requests across the set of nodes by at least one of:
        adjusting at least one internet protocol table associated with at least one of the nodes in the set based on the monitoring, and
        automatically dropping one or more of the incoming requests based on one or more network constraints.

7. The computer-implemented method of claim 1, wherein the at least one network performance characteristics comprises one or more of:
    decreasing downtime of a network associated with the cluster; and
    increasing a number of pairs of the plurality of services supported by the network resources.

8. The computer-implemented method of claim 1, wherein the scheduling comprises:
    automatically scaling one or more of a number of replicas running on the set of nodes for one or more of the plurality of services, and an amount of network resources reserved for one or more nodes in the set.

9. The computer-implemented method of claim 1, wherein the monitoring comprises:
    obtaining, by the network orchestrator, link utilization information of a network associated with the cluster, the network comprising: the set of nodes, at least one switch, and at least one router.

10. The computer-implemented method of claim 1, wherein the reserving comprises:
    communicating, by the network orchestrator, with at least one further network orchestrator associated with at least one further cluster to collaboratively reserve network resources requested between one of the plurality services and at least one further service implemented on the at least one further cluster.

11. The computer-implemented method of claim 1, wherein software is provided as a service in a cloud environment.

12. A computer program product comprising a computer readable storage medium having program instructions embodied therewith, the program instructions executable by a computing device to cause the computing device to:
    network resources requested between a plurality of services, wherein each of the services is implemented as one or more replicas running on a set of nodes of a cluster, managed by the network orchestrator, that use the network resources to serve incoming requests to the plurality services;
    reserve, by the network orchestrator based at least in part on the at least one specification, the network resources requested between the plurality of services;
    monitor utilization of the network resources; and
    schedule, by the network orchestrator based on the monitoring, one or more new replicas of the plurality of services and the incoming requests to the plurality of services to increase at least one network performance characteristic, wherein said scheduling comprises at least one of: scheduling one or more of the new replicas of a given one of the plurality of services on one or more nodes in the set, and scheduling one or more of the incoming requests for a given one of the plurality of services to one or more of the replicas corresponding to the given service.

13. The computer program product of claim 12, wherein the at least one specification identifies:
a first one of the plurality of services as a source service;
a second one of the plurality of services as a destination service;
a replica count for each of the source service and the destination service; and
one or more network requirements for the source and the destination service.

14. The computer program product of claim 13, wherein the at least one specification further identifies a tag corresponding to a chain of services comprising: the source service, the destination service, and at least another one of the plurality of services, and wherein the reserving comprises using the tag to reserve the network resources for the chain of services.

15. The computer program product of claim 13, wherein the one or more network requirements comprise at least one of:
a threshold latency value specified for the source service and the destination service;
a quality-of-service level; and
a bandwidth range.

16. The computer program product of claim 15, wherein the scheduling one or more new replicas for a given one of the plurality of services on one or more nodes in the set comprises:
performing at least one of an integer linear programming technique and a machine learning technique based at least in part on the one or more network requirements and one or more network constraints.

17. The computer program product of claim 12, wherein the one or more incoming requests for a given one of the plurality of services to one or more corresponding replicas of the given service comprises:
distributing the one or more incoming requests across the set of nodes by at least one of:
adjusting at least one internet protocol table associated with at least one of the nodes in the set based on the monitoring, and
automatically dropping one or more of the incoming requests based on one or more network constraints.

18. The computer program product of claim 12, wherein the at least one network performance characteristics comprises one or more of:
decreasing downtime of a network associated with the cluster; and
increasing a number of pairs of the plurality of services supported by the network resources.

19. The computer program product of claim 12, wherein the scheduling comprises:
automatically scaling one or more of a number of replicas running on the set of nodes for one or more of the plurality of services, and an amount of network resources reserved for one or more nodes in the set.

20. A system comprising:
a memory configured to store program instructions;
a processor operatively coupled to the memory to execute the program instructions to:
network resources requested between a plurality of services, wherein each of the services is implemented as one or more replicas running on a set of nodes of a cluster, managed by the network orchestrator, that use the network resources to serve incoming requests to the plurality services;
reserve, by the network orchestrator based at least in part on the at least one specification, the network resources requested between the plurality of services;
monitor utilization of the network resources; and
schedule, by the network orchestrator based on the monitoring, one or more new replicas of the plurality of services and the incoming requests to the plurality of services to increase at least one network performance characteristic, wherein said scheduling comprises at least one of: scheduling one or more of the new replicas of a given one of the plurality of services on one or more nodes in the set, and scheduling one or more of the incoming requests for a given one of the plurality of services to one or more of the replicas corresponding to the given service.

* * * * *